Feb. 16, 1932.   R. WINTZER   1,845,467
CONNECTING ROD
Filed Sept. 21, 1928   2 Sheets-Sheet 1
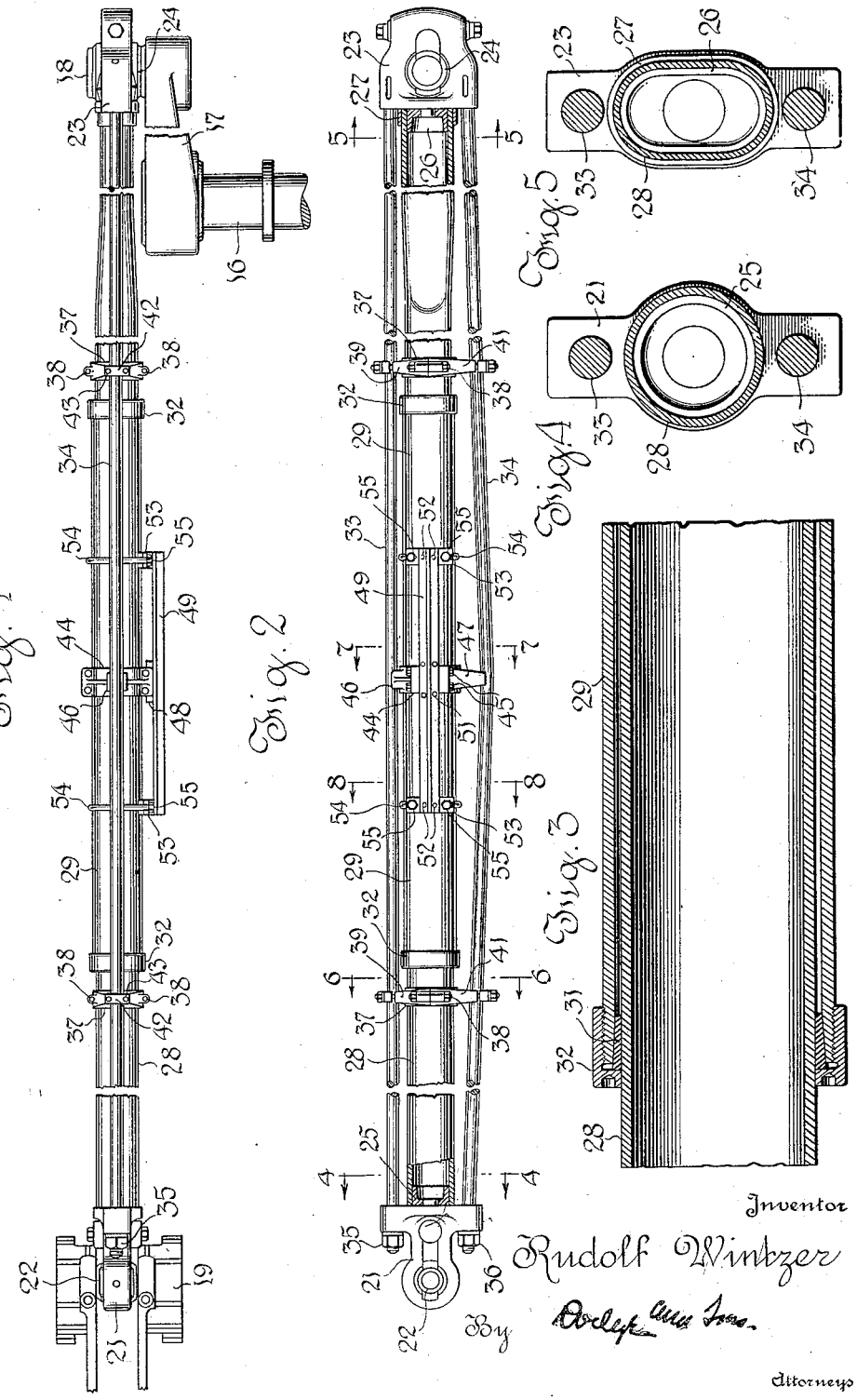

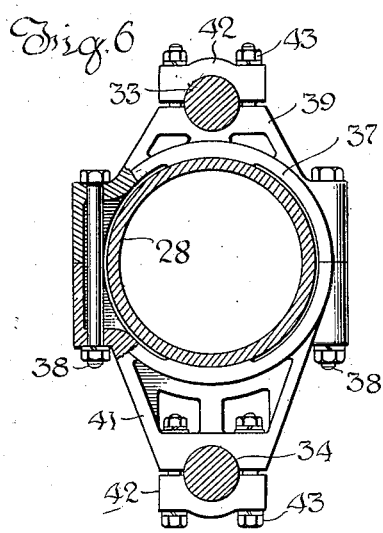
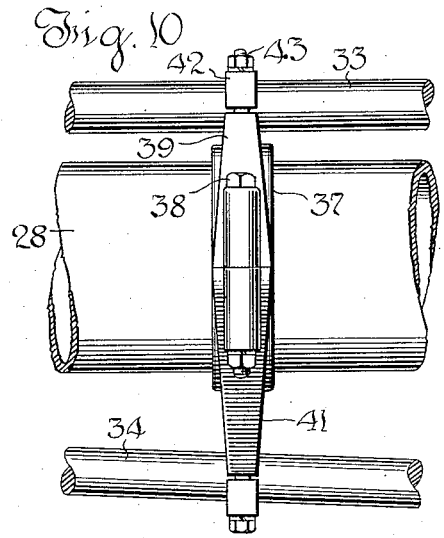
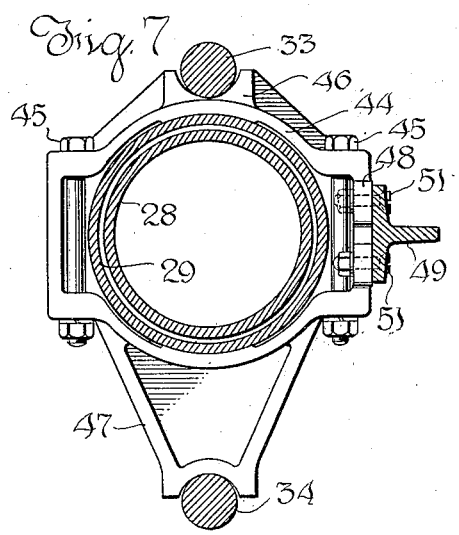
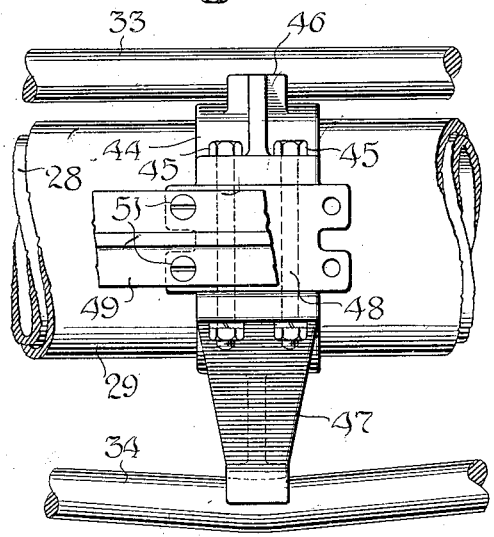
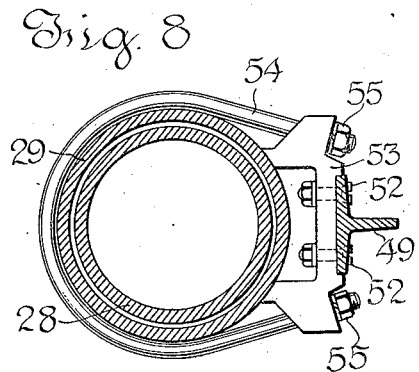
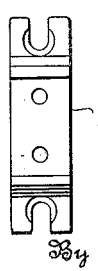

Patented Feb. 16, 1932                                                                                     1,845,467

UNITED STATES PATENT OFFICE

RUDOLF WINTZER, OF MILWAUKEE, WISCONSIN, ASSIGNOR TO NORDBERG MANUFACTURING COMPANY, OF MILWAUKEE, WISCONSIN, A CORPORATION OF WISCONSIN

CONNECTING ROD

Application filed September 21, 1928. Serial No. 307,536.

This invention relates to connecting rods or pitmen, and particularly to a composite structure which will be found useful in many cases where rods of unusual length are required.

The invention will be described as embodied in a connecting rod for use on stern wheel tow-boats. With such boats the rotative speed of the wheel is so low that it is necessary to use a long stroke engine, and consequently, a long connecting rod.

Heretofore the construction of rods used in stern wheel tow-boats has been extremely crude, it being common practice to use a wooden rod which was metal bound and which gave considerable trouble because of distortions which occurred as an incident to moisture.

Efforts have been made to substitute steel castings but serious practical difficulties have been encountered in the production of satisfactory castings for this purpose.

The present invention provides a rod made up of two end pieces (usually castings) each respectively carrying the wrist pin and crank pin bearings, an interposed tubular thrust member, and a plurality of tension rods or stays which preferably are braced to each other and to the tubular compression member. In this way a structure is produced in which the tubular rod takes all the compression stresses and the tension rods take all the tension stresses, the two coacting to withstand the lateral deflection or whip.

In certain cases I find it desirable to reinforce the tubular member near its mid-length by a concentric tube, preferably of somewhat larger diameter, connected at its ends to the tubular compression member. In order to preserve the strength of the parts, this connection is made by wedging clamps to avoid the formation of any holes or other cuts in the tubular compression member. In order to stiffen the structure at the crank end in a plane perpendicular to the crank pin, and also to secure clearance, the tubular thrust member is preferably slightly flattened so that it has an approximately oval form at its area of engagement with the end piece at the crank end of the rod.

The preferred embodiment of the invention is illustrated in the accompanying drawings, in which,—

Fig. 1 is a plan view showing the rod together with portions of the cross head and crank.

Fig. 2 is a side elevation of the rod, with parts broken away at the ends to show the construction.

Fig. 3 is an enlarged axial section showing the mode of connecting the reinforcing sleeve to the tubular thrust member by means of wedging clamps.

Fig. 4 is a section on an enlarged scale on the line 4—4 of Fig. 2.

Fig. 5 is a section on a similarly enlarged scale on the line 5—5 of Fig. 2.

Figs. 6, 7 and 8 are sections on still further enlarged scales, the planes of section being taken on the lines 6—6, 7—7 and 8—8, respectively of Fig. 2.

Fig. 9 is a face view of one of the clamps which carries the valve motion guide.

Figs. 10 and 11 are fragmentary side elevations at the scales of Figs. 6 and 7, showing the spreader structures illustrated in said figures respectively.

Referring first to Fig. 1, 16 is the crank shaft, 17 the crank and 18 a portion of the crank pin. 19 represents a portion of the cross head. The connecting rod which connects the cross head 19 with the crank pin 18 includes an end piece 21 having a bearing 22, of any suitable form, for the wrist pin, not shown. 23 represents an end piece having an adjustable bearing 24, of any suitable form, for the crank pin 18. The end piece 21 is formed with an annular boss 25, which, as shown in Fig. 4, is of circular contour.

The end piece 23, as best shown in Fig. 5, is formed with an annular boss 26 which may be described as of oval section. Surrounding this and spaced therefrom is a flange 27.

The thrust element of the rod comprises a tube 28 which, at the wrist pin end and throughout the major portion of its length, is of circular contour. This fits snugly over the boss 25 which centers and alines the end piece 21. The opposite end of the rod is deformed or flattened for a substantial distance, having an approximately oval section which fits in the interval between the boss 26 and the flange 27.

In most cases it is desirable to reinforce the middle portion of the tubular member 28, and this is accomplished by the use of a concentric tubular sleeve 29, which, preferably, is larger than the tubular member 28 and encircles the same. It is connected with the member 28 at its ends only, and preferably the connection is made by frictional wedging clamps made up of arcuate wedge members 31 which enter between the members 28 and 29, and a sleeve nut 32 which is threaded on the end of the member 29 and engages the wedges 31 to force these into the intervals between the members 28 and 29. In this way all cutting of the member 28 is avoided.

The end members 21 and 23 are connected by tension tie-rods 33 and 34, which are drawn up by means of nuts 35 and 36. The upper tie-rod 33 is straight, but the lower tie-rod, in order to assist in sustaining the weight of the thrust member 28 and sleeve 29, is deflected by suitable spreaders so as to form a sort of truss.

These spreaders are three in number in the example illustrated. Two of them are beyond the ends of the reinforcing member 29 and comprise annular yokes 37 clamped around the member 28 by means of the bolts 38. Each yoke 37 carries an upward projection 39 and a longer lower projection 41, each formed with a seat to receive, respectively, the tie-rods 33 and 34. The tie rods are clamped in such seats by caps 42 held by studs and nuts 43. The construction of the yoke 37 is clearly shown in Figs. 6 and 10.

At or about the middle of the reinforcing member 29 is a third yoke 44 which is clamped to the member 29 by means of bolts 45. It has an upward projection 46 with a seat for the rod 33 and a lower projection 47 of considerably greater length and having a seat for the rod 34. The yoke 44 is provided with a pad 48 to which is bolted a guide member 49 designed to coact with a portion of the distributing valve gear.

The member 49 is clamped to the pad 48 by the bolts 51. It is also connected at its end by means of bolts 52 to pads 53 which seat on the tubular member 28 and which are clamped thereto by stirrup irons 54 and nuts 55.

The parts 49 to 55 inclusive are not a necessary part of the rod structure, but are shown merely to illustrate a convenient manner for supporting on the rod related elements such as the guide member 49.

The parts are so arranged that the tubular member 28 acts alone to transmit thrust and the tie-rods 33 and 34 act alone to transmit tension between the end pieces 21 and 23. The tie-rods and the compression member, together with the spreader braces, form a truss structure which resists deflection of the rod.

In long and relatively light rods, such as are required for the service mentioned, there is a tendency for the rod to whip or deflect because of its oscillatory movement in a plane normal to the crank shaft, and also because of the weight of the rod itself. It is within the scope of the present invention to vary the proportions of the spreaders to resist this whip, and secure the necessary degree of rigidity of the rod.

The construction produces a connecting rod far superior to the wooden rods heretofore used, simple to manufacture and generally satisfactory for the service. It meets the peculiar conditions encountered in long stroke engines, such as those used on towboats, and avoids the manufacturing difficulties encountered in the construction of one-piece rods of the dimensions necessary for the service.

While I have described the structure in considerable detail, the arrangement and proportions of the parts will necessarily be varied to meet the requirement of particular installations. For example, in some cases the sleeve 29 might be entirely omitted, and in some cases it might be unnecessary to impart to the end of the rod the oval section shown at the crank end. Furthermore, as indicated in the description, the degree of deflection of the tie-rods is dependent on the stresses to be encountered, as will be well understood.

What is claimed is,—

1. A pitman comprising in combination, end members each having a bearing and a seat for a tubular thrust member; a tubular thrust member centered by said seats and acting in thrust between said end members; tie rods acting in tension between said end members and holding said parts in assembled relation; and a tubular reinforce shorter than said thrust member and mounted concentrically relatively thereto near the mid-length thereof.

2. A pitman comprising in combination, end members, one having a wrist pin bearing and a seat to receive a tubular thrust member, and the other having a crank pin bearing and a seat to receive a tubular thrust member of oval cross section; a tubular thrust member having ends formed to fit said seats closely and maintain the alinement of the end members; tension members reacting between said end members and braced to said thrust member; and a tubular reinforce shorter than said thrust member and mounted concentrically relatively thereto near the mid-length thereof.

3. A pitman comprising in combination, end members each having a bearing and a seat for a tubular thrust member; a tubular thrust member centered by said seats and acting in thrust between said end members; tie rods acting in tension between said end members and holding said parts in assembled relation; a tubular reinforce shorter and larger in diameter than the thrust member, surrounding the same near the middle thereof; and annular wedge clamps connecting the ends of the reinforce with the thrust member.

4. A pitman comprising in combination, end members each having a bearing and a seat for a tubular thrust member; a tubular thrust member centered by said seats and acting in thrust between said end members; a tubular reinforce, shorter than the thrust member surrounding the same near the mid-length thereof; spreader braces carried respectively by the tubular member and reinforce; and tension members connecting said end members and engaging said braces.

In testimony whereof I have signed my name to this specification.

RUDOLF WINTZER.